United States Patent [19]

Calhoun et al.

[11] 4,238,663
[45] Dec. 9, 1980

[54] TUBE BUNDLE CUTTING METHOD AND APPARATUS

[75] Inventors: Gregory L. Calhoun, Monroeville; Frank Bauer, Harmony, both of Pa.; Arthur W. Kramer, Doctor's Inlet, Fla.

[73] Assignee: Westinghouse Electric Corp., Pittsburgh, Pa.

[21] Appl. No.: 953,658

[22] Filed: Oct. 23, 1978

[51] Int. Cl.² .............................................. B23K 9/00
[52] U.S. Cl. ............................. 219/121 P; 29/426.4; 266/71; 219/60 A; 83/636; 29/429
[58] Field of Search .............. 219/121 P, 59, 137 R, 219/60 A, 60 R; 266/70, 71, 72, 50, 77, 46; 148/9 R; 29/427, 429, 253, 252, 282; 83/636

[56] References Cited

U.S. PATENT DOCUMENTS

| 2,448,089 | 8/1948 | Duvall | 266/71 |
| 2,575,737 | 11/1951 | Tyrner | 266/71 |
| 3,591,156 | 7/1971 | England | 266/72 |
| 3,857,158 | 12/1974 | Costello | 29/427 |

Primary Examiner—B. A. Reynolds
Assistant Examiner—M. Paschall
Attorney, Agent, or Firm—L. A. DePaul

[57] ABSTRACT

One or more pairs of vertically-spaced-apart sidewardly-aimable plasma arc cutting torches, the upper one angled upward and the bottom one downward, on the end of a horizontal boom movable longitudinally fore and aft and angularly sideward, are used to double-cut the tube bundle of a steam generator progressively in a manner clearing a path that accommodates torch assembly advancement.

3 Claims, 5 Drawing Figures

TUBE BUNDLE CUTTING METHOD AND APPARATUS

CROSS-REFERENCE TO RELATED APPLICATIONS

Commonly assigned U.S. Application Ser. No. 834,855 filed Sept. 19, 1977 to R. A. Blanco and A. A. Massaro, and commonly assigned U.S. Application Ser. No. 901,659 filed May 1, 1978 to R. E. Meuschke and R. W. Beer.

BACKGROUND OF THE INVENTION

This invention relates to a method and apparatus for effecting retubing of a steam generator in a nuclear power plant.

Nuclear reactor power plants utilize a steam generator having a tube bundle to transfer heat from a primary side reactor-heated-liquid to water on a secondary side to form steam for driving a turbine. Condenser leaks in power plants have caused circulating water, which is often brackish, to mix with the secondary-side water in the steam generator, resulting in the buildup of undesirable chemicals in the tube bundle. Water treatment and blowdown have not completely protected the steam generator tubes from corrosion and leaks. As the number of tubes subject to such leaks increases, the desirability of replacement or repair of the steam generator increases. Since removal of a steam generator in its entirety from a nuclear power plant requires removal of a large portion of a reinforced concrete containment vessel, such replacement of a generator in its entirety becomes time-consuming, expensive, and therefore undesirable.

SUMMARY OF THE INVENTION

The present invention is related in general to the replacement of the tube bundle in the steam generator in a nuclear power plant and more particularly to a method and apparatus for rapidly cutting through the tube bundle to be replaced, either to enable its removal from the steam generator and/or from the containment vessel. The present invention contemplates the use of one or more pairs of vertically spaced apart plasma arc cutting torches disposed on the end of pivotally mounted horizontal boom and provided with vertical and horizontal angular attitude adjustments on the end of such boom to realize the rapid cutting action desired. In certain operational modes, the cutting action may be improved by provision of vertical separation control between the pairs of cutting torches. Mechanism for angular attitude control and vertical separation control is arrived at through the medium of suitable actuator means.

Detailed description of a suitable mechanism for effecting angular and longitudinal movement of the horizontal boom carrying a tube cutting means at its end is described in commonly owned co-pending U.S. Patent Application Ser. No. 954,041, filed concurrently herewith and which is hereby incorporated by reference.

DESCRIPTION OF THE PREFERRED EMBODIMENT

Figure 1:
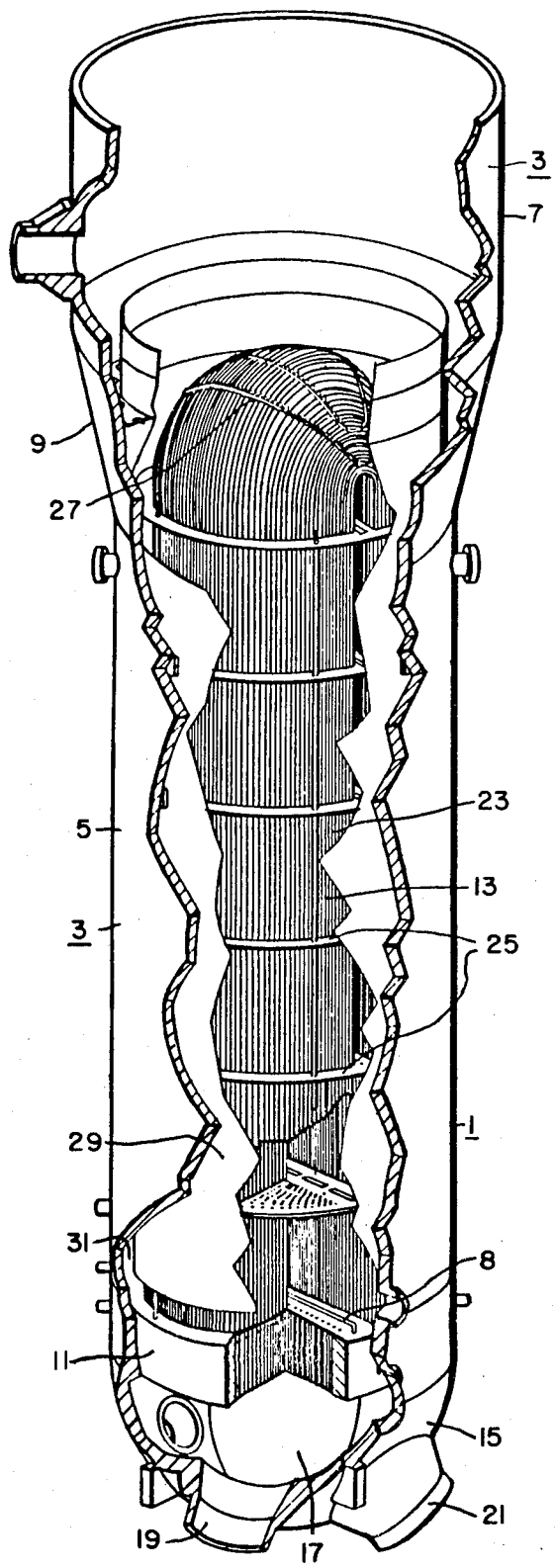
FIG. 1 is a vertical perspective view of the tube-bundle-containing portion of a nuclear power plant steam generator shown partially in section after removal of the top portion thereof.

Referring to FIG. 1 in the drawings, the steam generator 1 with which the method and apparatus of the present invention is intended to be employed typically includes a vertically oriented shell 3, the shell comprising a lower cylindrical portion 5 and an upper cylindrical portion 7, larger in diameter than the lower portion 5, and a frustoconical transition portion 9 joining the lower and upper portions 5 and 7. A tube sheet 11 is disposed in the lower end of the lower portion 5 of the shell 3 and has a plurality of holes for accommodating the ends of U-shaped tubes 13 which extend upwardly from the tube sheet 11 and are closely packed to form the tube bundle 23 disposed vertically within the lower portion 5 of the shell 3.

A hemispherically shaped channel head 15 is fastened to the tube sheet 11 and has a divider plate 17 disposed therein. A primary fluid inlet nozzle 19 supplies heated affluent primary fluid from a nuclear reactor core (not shown) to one portion of the channel head 15 and a discharge nozzle 21 is disposed in the channel head 15 to return the affluent primary fluid to such reactor core.

A plurality of support plates 25 are disposed throughout the tube bundle to support the tubes 13 at various locations along their length to reduce flow-induced vibrations. Anti-vibration bars 27 are also disposed adjacent to bends in the tubes 13 to prevent vibration in this portion of the tube bundle 23. A wrapper or sleeve 29 is disposed between the tube bundle 23 and the shell 3 so as to form an annular space 31 therebetween. As shown in the drawing, the upper part of the upper section 7 of the shell has been removed to gain access to the interior of the steam generator in preparation for removal and replacement of the tube bundle 23 therein. Various components of the steam generator usually disposed in the upper section 7 of the shell 3 also has been removed from the steam generator as shown in FIG. 1 to provide access to the top of the sleeve 29 and the top of the tube bundle 23 encircled thereby.

Typical operation of the steam generator, which per se forms no part of the present invention, involves the flow of heated primary fluid from a nuclear reactor core upwardly through the tube sheet 11 and through one branch of the U-shaped tube bundle 23 and downwardly through the other branch of the tube bundle and back through the tube sheet 11 to the discharge nozzle while secondary fluid above the tube sheet 11, and outside the tube bundle 23 becomes heated for forming steam for conveyance by conduit means (not shown) to a turbine (not shown) operated by such steam.

The cutting torch method and apparatus of the present invention for the expeditious cutting through transversely of a tube bundle in a steam generator can be employed for effecting separation of such tube bundle from the tube sheet, as in an early stage of operation of tube bundle removal such as described in copending patent application Ser. No. 834,855, and/or in effecting subsequent horizontal through-cuts of such tube bundle for disposal within longitudinal sections of the cylindrical radiation shield as in subsequent stages of tube bundle removal as set forth in such copending patent application as well as also described in copending patent application Ser. No. 901,659, where in both cases such radiation shield has been also referred to as a multisection or multisegment cask. At the present state of development of the torch cutting method and apparatus of the present invention, it appears that it is better suited for effecting the multiple through-cuts than for effecting the initial separation from the tube sheet, primarily due to a tendency for sputtering metal to deposit on the upper surface of such sheet and/or to appear between tube studs projecting upwardly therefrom, either of which may introduce a degree of complexity with respect to removal of such stubs from their mounting openings in the tube sheet, as is necessary in completing removal of the tube bundle from the steam generator.

Figure 2:
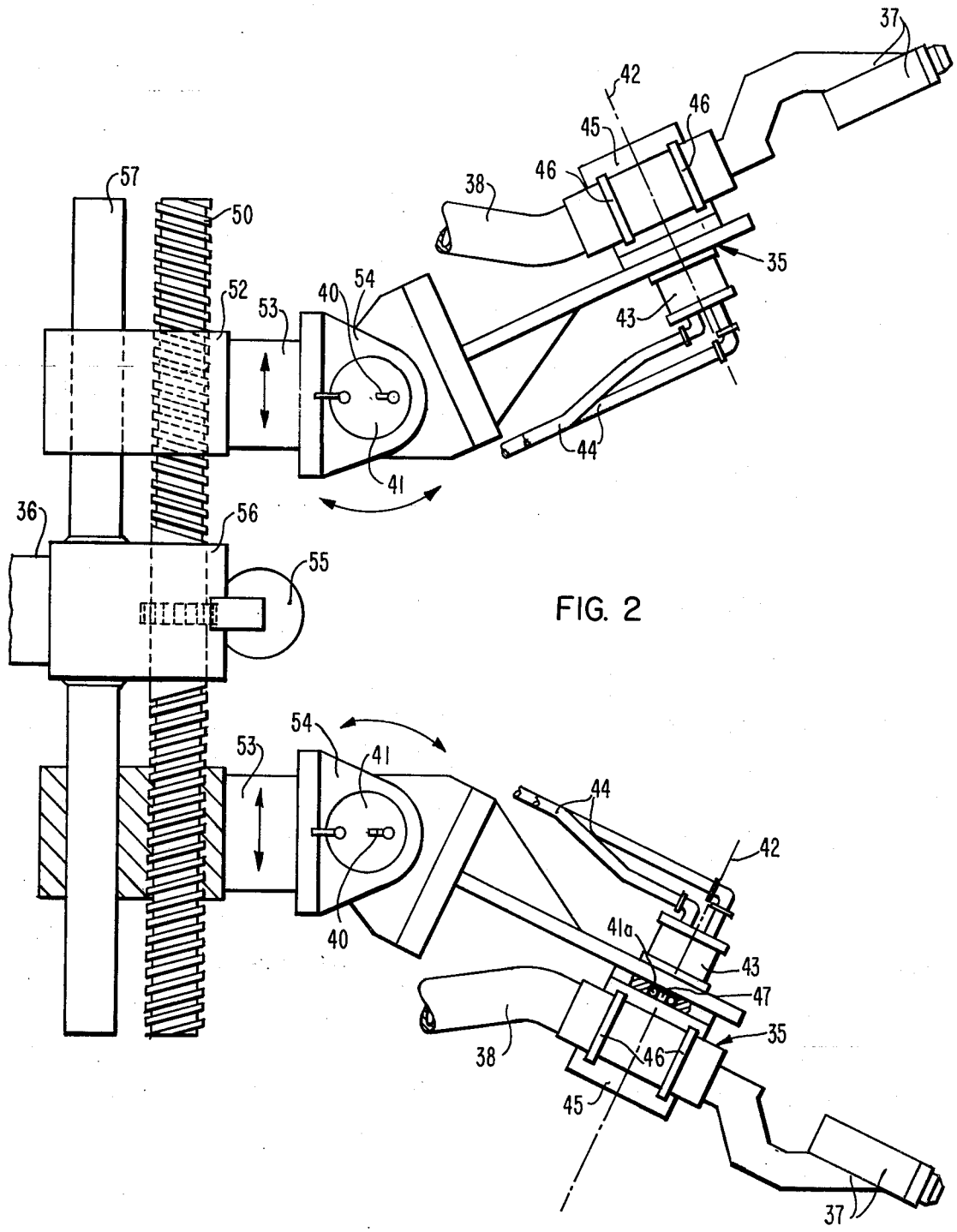
FIG. 2 is a vertical elevation view, partly in outline and partly in section, of an arrangement of vertically spaced apart plasma arc cutting torch assemblies for use in performing the cutting method of the present invention.
Figure 3:
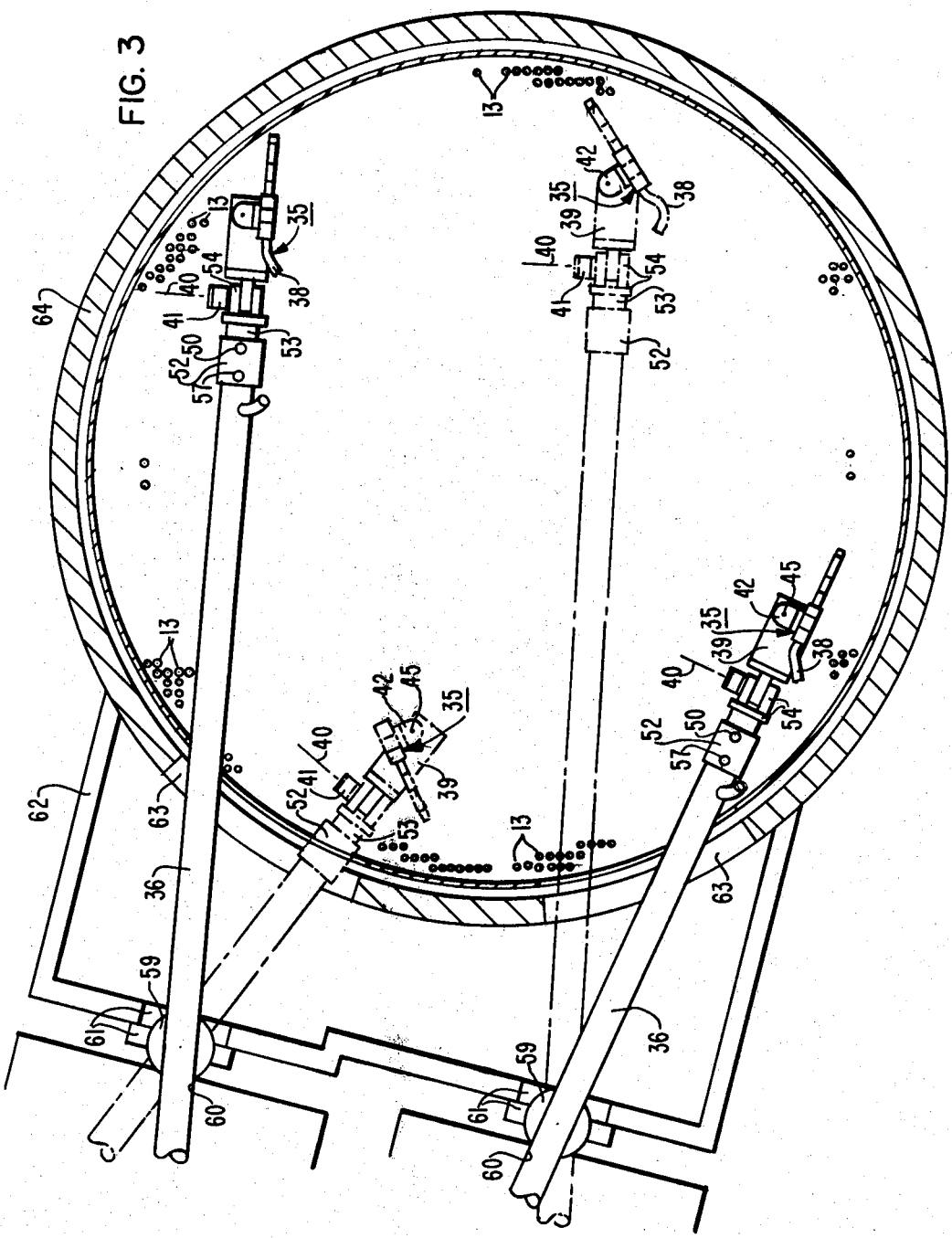
FIG. 3 is a plan view, partly in outline and partly in section, of the cutting torch apparatus of the present invention in affiliation with the cross-section of the tube bundle with which such apparatus is used.

Referring to FIGS. 2 and 3, the apparatus for performing the method of the present invention comprises a pair of plasma arc cutting torch assemblies 35 mounted one above the other on the end of a horizontal boom 36; several of which pairs of plasma arc torches and booms are shown in FIG. 3. Each of the assemblies 35 include a plasma arc torch 37 of a type, for example, available from the Linde Division of Union Carbide Corporation having suitable electrical and gas connections availed to such torch by way of a flexible section of conduit 38 and the interior of the boom 36 in a manner not shown in detail in the drawing. Each of the torches 37 may operate at such as five hundred amps and several hundred volts, with a high frequency AC pilot arc and a DC transfer arc to cut transversely through the tubes 13 of the tube bundle simultaneously at vertically spaced apart locations and a cutting penetration of, such as 6 tubes deep. Each of the torches 37 is carried on a projecting end of a mounting member 39 which is tiltable vertically to different angulated positions about a horizontal axis 40 by operation of a rotary hydraulic actuator 41. At the same time, the torch 37 is mounted on the projecting end of the mounting member 39 through the medium of a rotary joint including a ball bearing 41a to permit turning movement of the torches 37 about a transverse axis 42 that extends generally vertically according to the attitude of the mounting member 39 about the axis 40. For turning the torch about such axis 42, each of the assemblies is provided with a rotary hydraulic actuator 43 mounted on the mounting member 39. A pair of hydraulic supply lines 44 provides for operation of the rotary hydraulic actuator 43 in one direction or another according to selective preponderant pressurization of one line relative to the other. A mounting bracket 45 is clamped to the torch 37 through the medium of U-bolts 46 and acts as the medium by which the actuator 43 effects turning of such torch through the medium of a shaft 47.

Figure 4:
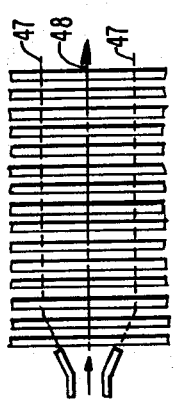
FIGS. 4 and 5 are schematic representations in elevation showing alternate cutting paths obtainable by use of the method and apparatus of the present invention.

By playing the torches simultaneously back and forth about their respective axes 42, while the boom 36 in which they are mounted is advanced horizontally forward, vertically spaced apart cuts are made in the tubes 13 of the tube bundle 23 within the steam generator. As the tube lengths between the cuts either fall out of the way or are displaced out of the way by suitable means a clearanceway is formed to permit continued advancement of such torches operated in such cutting mode. In FIG. 4, the dash lines 47 depict a cutting path for the torches 37 when advanced forwardly through the tube bundle along dot-dash lines 48 while being maintained angulated upwardly and downwardly, respectively, and simultaneously played from side to side.

In the apparatus of FIG. 3, the separation distance between the two cutting torch assemblies 35 is adjustable by a turning movement of a vertical positioner shaft 50 having threads at its upper and lower ends that extend in opposite directions, respectively. Internally threaded follower members 52 couple with the threads of the shaft 50 and support the torch assemblies 35 through the medium of a connector member 53 and a bracket 54 on which the rotary actuator 41 is mounted and which forms part of the rotary joint that defines the horizontal axis 40 about which the mounting members 39 are movable vertically. A motorized gear drive assembly 55 is carried on a block 56 attached to the end of the boom 36 for effecting turning of the positioner shaft 50, and vertically extending guide pins 57 attached to such block 56 extend slidably through openings in the follower members 52 to maintain alignment of the assemblies.

Figure 5:

As an alternate mode of operation of the cutting torches 37, they may be operated in a mode to effect cutting of the tubes 13 along a sawtooth shaped line 47 as depicted in FIG. 5 by operating the torches at intervals between periods of repositioning of such torches both horizontally and vertically. A first segment of the zigzag cuts is made with the upper torch pointing slightly upwardly and the lower torch pointing slightly downwardly and played back and forth to cut through a number of tubes wide and so many tubes deep. Both torches will then be shut off and the mechanism operated to advance the torch assemblies toward one another. Once they are in the vertically compacted state, the boom will then be advanced horizontally a certain selected distance and the torches 37 again operated to effect the upwardly and downwardly angled cuts in the tubes 13 a certain number of tubes deep and a certain number of tubes wide, according to the cutting capability of the torch in the forward direction and the side play activity introduced by operation of the actuators 43.

As aforementioned, the construction and support for the boom 36 may be as shown and described in copending application Ser. No. 954,041, filed concurrently herewith. Simplistically, such support for the boom 36 is shown in FIG. 4 in the form of a vertical cylinder 59 having a horizontal bore 60 passing therethrough in which the boom 36 is slidably disposed to permit its longitudinal movement. The cylinder 59 is mounted in a socket means 61 that constrains the cylinder 59 against tilting while permitting its turning movement about a fixed vertical axis, coaxial therewith, to permit angulation of the boom back and forth about such axis. The socket means 61 in turn is carried in a radiation shielding member 62 that covers openings 63 through which the booms extend to gain access to the tubes 13 to be cut. The openings 63 may be through the wall of a vessel 64 that may represent the shell of the steam generator wherein the method and apparatus of the present invention is used in connection with separating the tube bundle from the tube sheet of such generator and/or such vessel may represent a shielded radiation enclosure or cask into which such tube bundle has been introduced after having effected such tube sheet severance operation; as will be appreciated by reference to the related copending patent application referred to previously herein.

Having now described the invention, what is claimed as new and described to be secured by U.S. Letters Patent is:

1. A method for cutting through a bundle of vertically-extending tubes of a heat exchanger, comprising the steps of, simultaneously advancing a pair of vertically-spaced-apart cutting torches horizontally into said bundle, while the upper torch is aimed upwardly and the bottom torch is aimed downwardly, thereby effecting horizontal cuts through tubes of such bundle simultaneously at vertically-spaced-apart intervals, enabling removal of the double-cut tube sections from the bundles, and moving such torches also laterally to enable cutting-action-traverse of the entire bundle cross section.

2. The method of claim 2, wherein said torches are retracted toward one another at intervals for accommodating their horizontal repositioning within the clearanceway provided by removal of the double-cut tube sections.

3. The method of claim 2, wherein said torches are also reamed toward horizontal during such repositioning.

* * * * *